United States Patent [19]

Rodriguez

[11] Patent Number: 5,633,459
[45] Date of Patent: May 27, 1997

[54] METHOD AND APPARATUS FOR TESTING PISTON RINGS

[76] Inventor: Otto M. Rodriguez, 8564 Timberlake Dr., Riverdale, Ga. 30296

[21] Appl. No.: 608,677

[22] Filed: Feb. 29, 1996

[51] Int. Cl.[6] .................................................. G01M 15/00
[52] U.S. Cl. ............................................. 73/120; 73/49.7
[58] Field of Search ........................ 73/116, 120, 49.7

[56] References Cited

U.S. PATENT DOCUMENTS

| | | | |
|---|---|---|---|
| 3,834,220 | 9/1974 | Westmoreland | 73/49.7 |
| 3,874,225 | 4/1975 | Fegel | 73/49.7 |
| 4,157,028 | 6/1979 | Moffett, III | 73/49.7 |
| 4,171,636 | 10/1979 | Bergeron | 73/49.7 |
| 4,574,620 | 3/1986 | Cohl | 73/49.7 |
| 4,617,824 | 10/1986 | Cybulski et al. | 73/49.7 |
| 4,667,507 | 5/1987 | Eriksson | 73/49.7 |
| 5,187,974 | 2/1993 | Mellits et al. | 73/49.7 |
| 5,193,381 | 3/1993 | Heimann | 73/49.7 |
| 5,195,362 | 3/1993 | Eason | 73/49.7 |
| 5,412,978 | 5/1995 | Boone et al. | 73/49.2 |

*Primary Examiner*—Richard Chilcot
*Assistant Examiner*—George M. Dombrooke
*Attorney, Agent, or Firm*—James B. Middleton

[57] ABSTRACT

Piston rings are tested for their effectiveness by removing the cylinder heads of an engine, and sealing one cylinder with a pressure cap. Fluid under pressure is admitted into the cylinder, and time required to dissipate the pressure is monitored. A long time to dissipate the pressure indicates good rings, and a short time indicates bad rings. The several cylinders are sealed an tested one at a time. The pressure cap has a tire valve therein so the conventional air hose can be used to pressurize the cylinder. Preferably, engine oil is placed into the cylinder before the pressure cap is put into place so it is the oil that must move past the piston rings. A hold-down for the pressure cap may be fixed to the engine block using a screw into one of the holes for the cylinder head screws.

8 Claims, 1 Drawing Sheet

METHOD AND APPARATUS FOR TESTING PISTON RINGS

BACKGROUND OF THE INVENTION

1. Field of the Invention

This invention relates generally to the testing of piston rings or the like, and is more particularly concerned with a method and apparatus for testing rings by pressurizing a cylinder with fluid and monitoring the dissipation of the pressure.

2. Discussion of the Prior Art

Piston driven internal combustion engines depend on a tight seal between the piston and the cylinder wall to prevent the expanding gases from "blowing by" the piston. With a close fitting seal between the piston and the cylinder wall, the exploding gases force the piston to move within the cylinder to transmit energy to the crankshaft. The seal between the piston and the cylinder is effected by one or more piston rings floating in circumferential grooves around the body of the piston. When piston rings are excessively worn they do not adequately seal, and there is a loss of proper pressure within a cylinder. The prior art includes means for measuring the compression in a cylinder as the piston moves up in the cylinder; but, when one needs to know if the piston rings are sealing properly, the pistons must be removed from the cylinder, and the rings directly inspected.

There has been some effort at determining the condition of the rings without the necessity of removal of the piston, such efforts being as shown by the patents to Harpst (U.S. Pat. No. 1,337,132) and to Morgan et al. (No. 2,003,949). In both of these patents, the cylinder is pressurized in an effort to determine if the cylinder can retain the fluid under pressure. However, in both of these patents the cylinder is pressurized through the spark plug opening or the like, and retention of the pressure is dependent on the piston rings and the valves. As a result, one cannot be sure of the particular problem without a direct inspection of the rings and the valves Thus, the prior art does not provide a method or apparatus for testing the seal effected by the piston rings without removal of the piston from the cylinder for direct inspection of the rings.

SUMMARY OF THE INVENTION

The present invention provides a method and apparatus for testing the ability of piston rings to retain pressure within a cylinder. The cylinder head is removed, and one cylinder of the engine is closed by a pressure cap. The cylinder is then pressurized with a fluid, and the pressure is monitored while the pressure dissipates. If the pressure dissipates quickly, the rings are not sealing properly, and if the pressure dissipates slowly, the rings are sealing adequately.

In the preferred embodiment of the invention, the pressure cap includes a pressure gauge, and a valve for allowing pressurization of the cylinder with a conventional air hose. A quantity of motor oil is preferably poured into the cylinder before sealing the cylinder with the pressure cap, so the effectiveness of the rings is tested with a higher viscosity fluid than a gas for more accurate monitoring of pressure dissipation

BRIEF DESCRIPTION OF THE DRAWINGS

These and other features and advantages of the present invention will become apparent from consideration of the following specification when taken in conjunction with the accompanying drawings in which.

DETAILED DESCRIPTION OF THE EMBODIMENT

Figure 1:
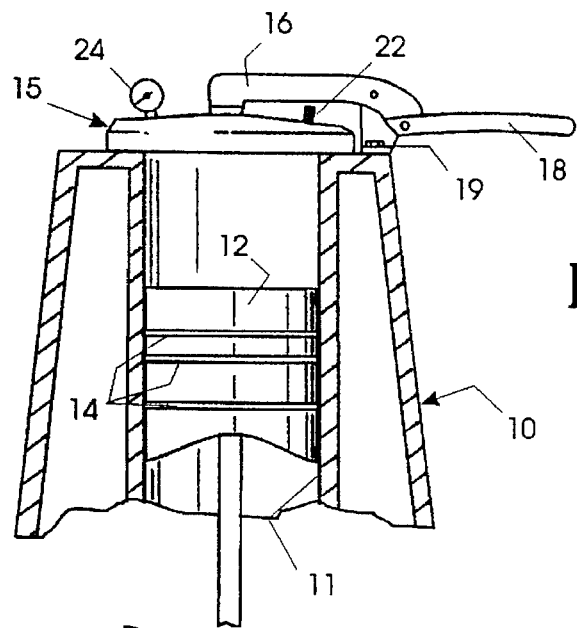
FIG. 1 is a diametrical cross-sectional view of an engine cylinder having a piston therein, and a pressure cap made in accordance with the present invention installed thereon.

Referring now more particularly to the drawings, and to that embodiment of the invention here presented by way of illustration, FIG. 1 shows, in schematic representation, an engine block 10 having a cylinder 11 therein. A piston 12 is received within the cylinder 11, and includes a plurality of circumferential piston rings 14 for sealing the piston 12 with respect to the cylinder 11.

Those skilled in the art will understand that the engine block 10 will normally have one or more cylinder heads received thereon, the head containing valves, spark plugs and the like. In carrying out the method of the present invention, however, a cylinder head is removed, and a pressure cap 15 is placed over one cylinder 11 to be tested. The pressure cap 15 is held in place by any suitable holding means; and, as here shown rather schematically, a clamping means is fixed to the block 10, and has an arm 16 engaging the pressure cap 15. A handle 18 can be manipulated to clamp or release the clamping force of the arm 16.

Figure 2:
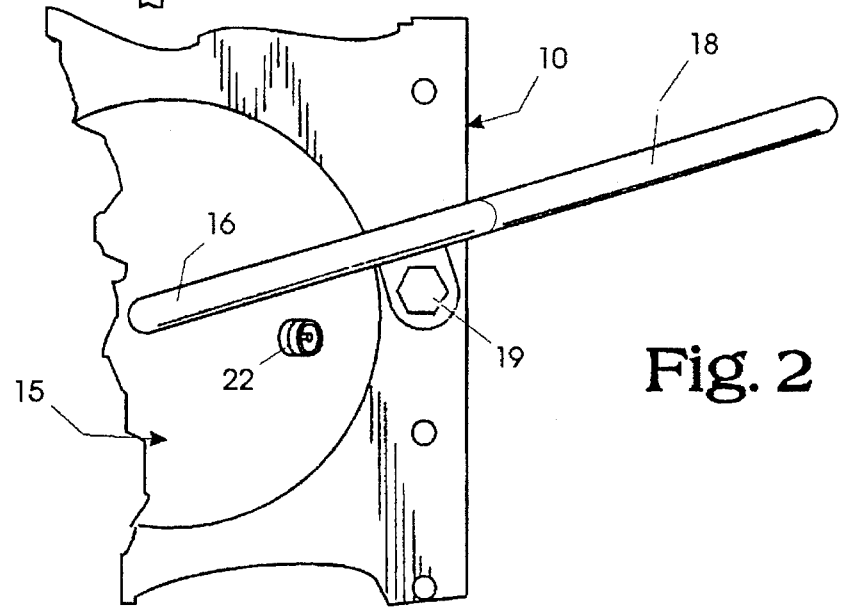
FIG. 2 is a fragmentary top plan view showing attachment of the pressure cap to the engine; and, FIG. 3 is an enlarged, diametrical cross-sectional view showing the pressure cap illustrated in FIGS. 1 and 2.

It is contemplated that the clamping means will comprise a toggle clamping apparatus of the type well known under the trademark "Vise Grip". Numerous other mechanical arrangements will work quite well with the present invention, but the toggle apparatus is both quick and effective. Looking at FIGS. 1 and 2, it will be seen that the clamping means is preferably held in place by a screw 19 received in one of the holes used to hold the cylinder head in place. It will be understood that these holes are distributed completely around the block 10, so at least one hole will be conveniently located for any cylinder to be tested.

Figure 3:
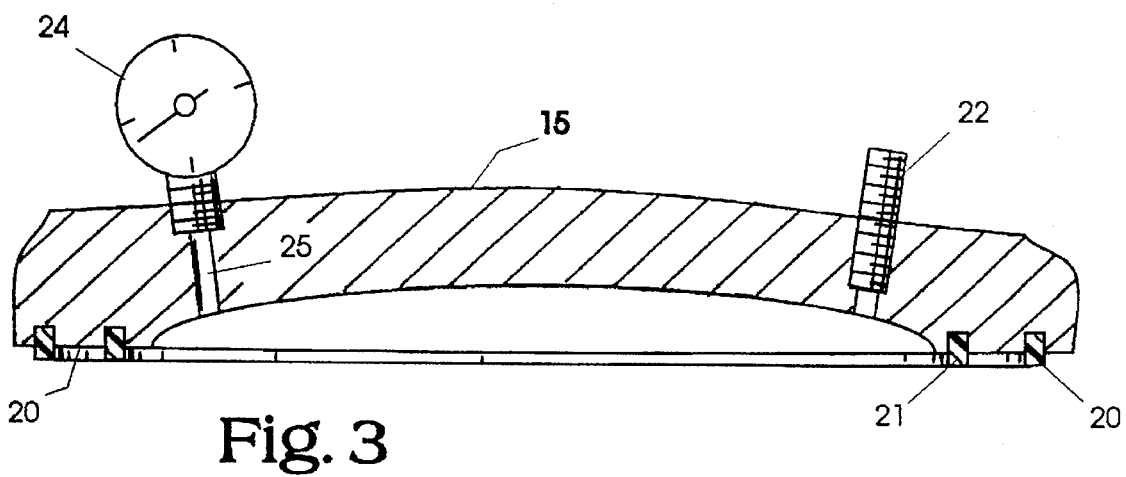

Turning now to FIG. 3 of the drawings, the pressure cap 15 is shown in more detail. The pressure cap 15 has a generally flat lower face 20 that receives sealing means 21. The sealing means 21 is here shown as a rectangular seal or gasket partially received within an appropriate groove in the lower face 20. It will be understood that the object is simply to provide an effective seal, and the sealing means may comprise O-rings, flat gaskets or other structures. As here shown there is a plurality of seals 21 to allow one pressure cap 15 to be used with different sizes of cylinders. Any number of seals 21 may be included, and the cap 15 will be effective so long as one of the seals 21 seals the cap 15 with respect to the block 10.

The cap 15 includes a valve member 22 extending through the pressure cap 15 to communicate with the cylinder 11. While various valves may be used, the object of the valve 22 is to allow admission of air under pressure, so a conventional tire valve is contemplated. The tire valve includes the necessary check valve, and is convenient and readily available.

The cap 15 also receives a gauge 24 connected to a passageway 25 which communicates with the cylinder 11. The gauge is a conventional pressure gauge, and will indicate the fluid pressure within the cylinder 11.

With the above described structure in mind, the steps for carrying out the method of the present invention should be understandable.

An engine may exhibit symptoms of bad rings, but one cannot be certain that it is the rings that are bad. Various tests can be run; but, the final test to determine the condition of the rings is to remove the pistons, such as the piston 12, from the cylinders, such as the cylinder 11, and directly inspect the rings, such as the rings 14. Such a test is time consuming, hence expensive.

The present invention provides a method for determining the condition of the rings without removing the pistons from the cylinders. The technique is to exert pressure in the cylinder, and monitor the cylinder to determine if the rings can hold the pressure. To accomplish this, it is important first to remove the cylinder head in order to be sure it is the piston rings that are holding, or not holding, the pressure. Thus, the method of the present invention comprises the steps of removing the cylinder head, then covering a selected cylinder with a pressure cap 15.

Preferably, when the cylinder to be tested is selected, a quantity of motor oil is poured into the cylinder; then the pressure cap is placed over the cylinder. The cap 15 is held in place by the clamping means, and air under pressure is introduced into the cylinder through the valve 22. As a result, oil will cover the piston 12, and will be the fluid that is against the rings 14. Air will be over the oil and exert pressure on the oil. If the rings 14 seal poorly, oil will be forced past the rings and into the engine crankcase, leaving greater volume within the cylinder 11, so the pressure will go down.

It is contemplated that the oil used for the test will be a conventional engine oil, such as 10W 40 or other popular oil. The oil needs to be standardized so the test results will be consistent, but of course more than one oil can be tested, and standards published for each oil. Also, the initial pressure should be standardized. Perhaps 50 psig will be used as the initial pressure, and time will be measured until the pressure reaches some low point, say 20 psig.

The method of the present invention therefore includes the steps of removing the cylinder head of an engine, and selecting a cylinder to be tested. The piston will be moved down sufficiently to leave empty space above the piston, preferably to bottom dead center so the piston cannot move down to reduce the pressure. Next, a predetermined quantity of oil is poured into the cylinder, perhaps 8 ounces, or about 240 ml., and the cylinder is closed with the pressure cap 15. With the cap 15 tightly on the cylinder, air is forced into the cylinder 11 through the valve 22 until the predetermined pressure is reached. Then, the gauge 24 is observed until the pressure reaches the predetermined minimum. A short time for the pressure to drop indicates poor sealing by the rings, and a long time indicates good sealing. Standards can be quickly established by performing the test on cylinders known to have good rings, and on cylinders known to have bad rings.

It will be understood that many different arrangements can be used to seal the top of the cylinder being tested, and many different hold-downs can be used. While the tire valve 22 is readily available, other forms of valve can be used, so long as air under pressure can be admitted into the cylinder.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. A method for determining whether or not piston rings in an engine are sealing adequately, said engine including at least one cylinder having a piston reciprocable therein, and a plurality of rings extending circumferentially of said piston for sealing said piston with respect to the wall of said cylinder, and a cylinder head for normally closing the upper end of said cylinder, said method comprising the steps of removing said cylinder head, sealing the upper end of said cylinder with a pressure cap having a valve therein, admitting fluid under pressure through said valve until a predetermined high pressure is reached, and monitoring the reduction in said high pressure for determining the seal between said piston and said wall of said cylinder.

2. A method as claimed in claim 1, and further including the step of placing a quantity of oil into the cylinder before the said step of sealing the upper end of said cylinder, and wherein said step of admitting fluid under pressure through said valve comprises admitting air under pressure.

3. A method as claimed in claim 2, wherein said engine includes a plurality of cylinders with at least one cylinder head for enclosing said plurality of cylinders, and said step of sealing the upper end of said cylinder comprises sealing one cylinder of said plurality of cylinders, and including the step of subsequently sealing the upper end of another cylinder of said plurality of cylinders and repeating the remaining steps.

4. A method as claimed in claim 2, and including the step of moving the piston in said one cylinder down to the bottom dead center before said step placing a quantity of oil into the cylinder.

5. Apparatus for testing piston rings, in an engine including a block defining at least one cylinder, a piston reciprocable within said cylinder, and a cylinder head selectively fixable to said block for closing the upper end of said at least one cylinder, said apparatus comprising a pressure cap sized to cover said upper end of one cylinder, sealing means disposed between said pressure cap and said block, means for urging said pressure cap against said block, and valve means in said pressure cap for admitting fluid under pressure through said pressure cap and into said one cylinder above said piston.

6. Apparatus as claimed in claim 5, and further including gauge means in said pressure cap for indicating the pressure within said one cylinder.

7. Apparatus as claimed in claim 6, wherein said block defines a plurality of threaded holes for fixing said cylinder head to said block, said means for urging said pressure cap against said block including screw means receivable by at least one of said threaded holes.

8. Apparatus as claimed in claim 7, wherein said sealing means comprises at least one gasket carried by said pressure cap and engageable with said block.

* * * * *